United States Patent
Kooyman et al.

(10) Patent No.: US 9,914,091 B2
(45) Date of Patent: Mar. 13, 2018

(54) METHOD FOR COOL DRYING A GAS

(71) Applicant: ATLAS COPCO AIRPOWER, NAAMLOZE VENNOOTSCHAP, Wilrijk (BE)

(72) Inventors: Maarten Kooyman, Wilrijk (BE); Johan Hendrik R. De Herdt, Wilrijk (BE); Frank Jacques E. Roelants, Wilrijk (BE); Frits Cornelis A. Baltus, Wilrijk (BE)

(73) Assignee: Atlas Copco Airpower, Naamloze Vennootschap, Wilrijk (BE)

( * ) Notice: Subject to any disclaimer, the term of this patent is extended or adjusted under 35 U.S.C. 154(b) by 0 days.

(21) Appl. No.: 15/309,603

(22) PCT Filed: Apr. 27, 2015

(86) PCT No.: PCT/BE2015/000013
§ 371 (c)(1),
(2) Date: Nov. 8, 2016

(87) PCT Pub. No.: WO2015/168752
PCT Pub. Date: Nov. 12, 2015

(65) Prior Publication Data
US 2017/0144103 A1   May 25, 2017

(30) Foreign Application Priority Data

May 9, 2014   (BE) .................................. 2014/0345

(51) Int. Cl.
*B01D 53/26*  (2006.01)
*F25B 41/06*  (2006.01)

(52) U.S. Cl.
CPC .......... *B01D 53/265* (2013.01); *F25B 41/062* (2013.01); *F25B 2400/0403* (2013.01);
(Continued)

(58) Field of Classification Search
CPC ..... B01D 53/265; B01D 53/26; F25B 41/062; F25B 2600/2513; F25B 2400/0403; F25B 2600/2501

See application file for complete search history.

(56) References Cited

U.S. PATENT DOCUMENTS 6,393,850 B1 * 5/2002 Vanderstraeten .... B01D 5/0039
                                                              62/196.3
6,467,292 B1 * 10/2002 Praxmarer ............ F25B 49/025
                                                             62/228.3
(Continued)

FOREIGN PATENT DOCUMENTS

EP   1103296 A1   5/2001
EP   1607699 A1   12/2005

OTHER PUBLICATIONS

International Search Report (ISR) dated Oct. 7, 2015, for PCT/BE2015/000013.
(Continued)

*Primary Examiner* — Emmanuel Duke
(74) *Attorney, Agent, or Firm* — Bacon & Thomas, PLLC

(57) ABSTRACT

A method for cool drying gas, making use of a heat exchanger whose primary section forms the evaporator of a cooling circuit with a compressor, an expansion valve and a bypass pipe across the compressor with a hot gas bypass valve, whereby the method makes use of a formula that makes the link between the state of the expansion valve and hot gas bypass valve, whereby on the basis of this formula: either the state of the expansion valve is adjusted as a function of the state of the hot gas bypass valve; or adjusting the state of the hot gas bypass valve as a function of the state of the expansion valve or vice versa; or the states of both valves are controlled with respect to one another.

8 Claims, 2 Drawing Sheets

(52) U.S. Cl.
CPC ............... *F25B 2600/2501* (2013.01); *F25B 2600/2513* (2013.01)

(56) References Cited

U.S. PATENT DOCUMENTS

2002/0174665 A1* 11/2002 Pritchard ................. C09K 3/12
62/77
2005/0274133 A1* 12/2005 Barsanti ......................... 62/225

OTHER PUBLICATIONS

International Preliminary Report on Patentability (IPRP) dated May 2, 2016, for PCT/BE2015/000013.

* cited by examiner

METHOD FOR COOL DRYING A GAS

The present invention relates to a method for cool drying a gas.

More specifically, the invention is intended for cool drying a gas, whereby water vapour in the gas is condensed by guiding the gas through the secondary section of a heat exchanger whose primary section forms the evaporator of a closed cooling circuit in which a coolant can circulate by means of a compressor that is installed in the cooling circuit downstream from the evaporator, and which is followed by a condenser and an expansion valve through which the coolant can circulate, and a bypass pipe with a hot gas bypass valve therein that connects the outlet of the compressor to an injection point upstream from the compressor.

BACKGROUND OF THE INVENTION

Cool drying is, as is known, based on the principle that by lowering the gas temperature the moisture in the gas condenses, after which the condensate is separated in a liquid separator and after which the gas is heated again such that this gas is no longer saturated.

It is known that in most cases compressed air, supplied by a compressor for example, is saturated with water vapour or, in other words, it has a relative humidity of 100%. This means that condensation occurs in the event of a temperature drop to below the 'dew point'. Because of the condensed water, corrosion occurs in the pipes and tools that draw off compressed air from the compressor, and equipment can present premature wear.

It is consequently necessary to dry this compressed air, which can be done in the aforementioned way by cool drying. Air other than compressed air or other gases can also be dried in this way.

In the known method the cooling circuit is controlled via two separate controls: a control of the expansion valve on the one hand and a control of the hot gas bypass valve on the other.

The expansion valve is used to expand just enough coolant so that the coolant is always superheated when entering the compressor.

As a result of this superheating the liquid coolant present can be evaporated before it is guided to the compressor, in order to provide optimum protection of the compressor against liquid coolant.

The superheating of the coolant can be determined on the basis of the measurements of the evaporator pressure and the evaporator temperature, and it can be determined whether the expansion valve has to be opened more or less in order to control the superheating of the coolant in this way.

The hot gas bypass valve is used to ensure that the evaporator pressure is not too low so that the air in the heat exchanger is not cooled too greatly, as otherwise the condensate would freeze.

By tapping off a certain quantity of coolant in the form of hot gas from the cooling circuit and driving it through the bypass pipe across the compressor, the evaporator pressure, and automatically the coolant temperature, is kept under control. This can be necessary for example with a variable load of the cooling circuit.

In this way the cooling capacity of the device can decrease and prevent the condensate in the heat exchanger from freezing or the temperature of the coolant falling too greatly.

The hot gas bypass valve is hereby controlled by a control unit that is connected in a known way to one or more sensors.

These sensors are affixed for example to determine the evaporator pressure. When these sensors register an evaporator pressure that is too low, the control unit sends a signal to the hot gas bypass valve to open this last-mentioned. In this way a certain quantity of coolant is guided through a bypass pipe across the compressor so that the cooling capacity of the cooling circuit decreases.

A disadvantage is that two separate controls have to be provided, which makes the method complicated.

Moreover the control of the expansion valve influences the control of the hot gas bypass valve and vice versa.

Indeed, if the expansion valve opens or closes to obtain fixed superheating even with a variable load, the evaporator pressure will rise or fall. As a result the hot gas bypass valve must also be adjusted to be able to adjust the evaporator pressure to the desired setpoint. The desired evaporator pressure depends on the load.

In other words a change of the state of the hot gas bypass valve will ensure that the expansion valve also has to be adjusted.

This makes it difficult to guarantee the good operation of the cooling circuit.

SUMMARY OF THE INVENTION

The purpose of the present invention is to provide a solution to at least one of the aforementioned and other disadvantages.

The object of the present invention is a method for cool drying a gas, whereby water vapour in the gas is condensed by guiding the gas through the secondary section of a heat exchanger whose primary section forms the evaporator of a closed cooling circuit in which a coolant can circulate by means of a compressor that is installed in the cooling circuit downstream from the evaporator and which is followed by a condenser and an expansion valve through which the coolant can circulate and a bypass pipe with a hot gas bypass valve therein that connects the outlet of the compressor to an injection point upstream from the compressor, whereby the method makes use of an experimentally determined formula that reflects the link between the state of the expansion valve and the hot gas bypass valve for the control of the fixed superheating of the coolant downstream from the evaporator and a desired evaporator pressure, whereby the method consists of, on the basis of this formula:

- either adjusting the state of the expansion valve as a function of the state of the hot gas bypass valve; or
- adjusting the state of the hot gas bypass valve as a function of the state of the expansion valve; or
- controlling the states of both valves with respect to one another.

Experiments have shown that for each load of the cooling circuit there is an associated fixed state or opening of the expansion valve, and an associated fixed state or opening of the hot gas bypass valve. In other words there is a link between the expansion valve and the hot gas bypass valve.

An advantage is that such a link can be expressed in a formula that enables the opening of the expansion valve to be calculated from the opening of the hot gas bypass valve and vice versa.

An advantage of the method according to the invention is that, by making use of such a formula, the states of both valves can be controlled with respect one another.

Consequently it can be ensured that, with the separate control of the states of both valves, the thus determined states correspond to the formula so as to guarantee the good operation of the cooling circuit.

Another advantage is that by making use of the formula, it can operate with only one control, for example the control of the expansion valve, and that the state of the hot gas bypass valve is simply calculated from the formula.

This has the advantage that there are not two controls that can affect one another, such that a more stable operation of the dryer is obtained and the dryer is less complex because there is only one control.

BRIEF DESCRIPTION OF THE DRAWINGS

With the intention of better showing the characteristics of the invention, a few preferred applications of the method for cool drying a gas according to the invention are described hereinafter by way of an example, without any limiting nature, with reference to the accompanying drawings, wherein.

DETAILED DESCRIPTION OF THE INVENTION

Figure 1:
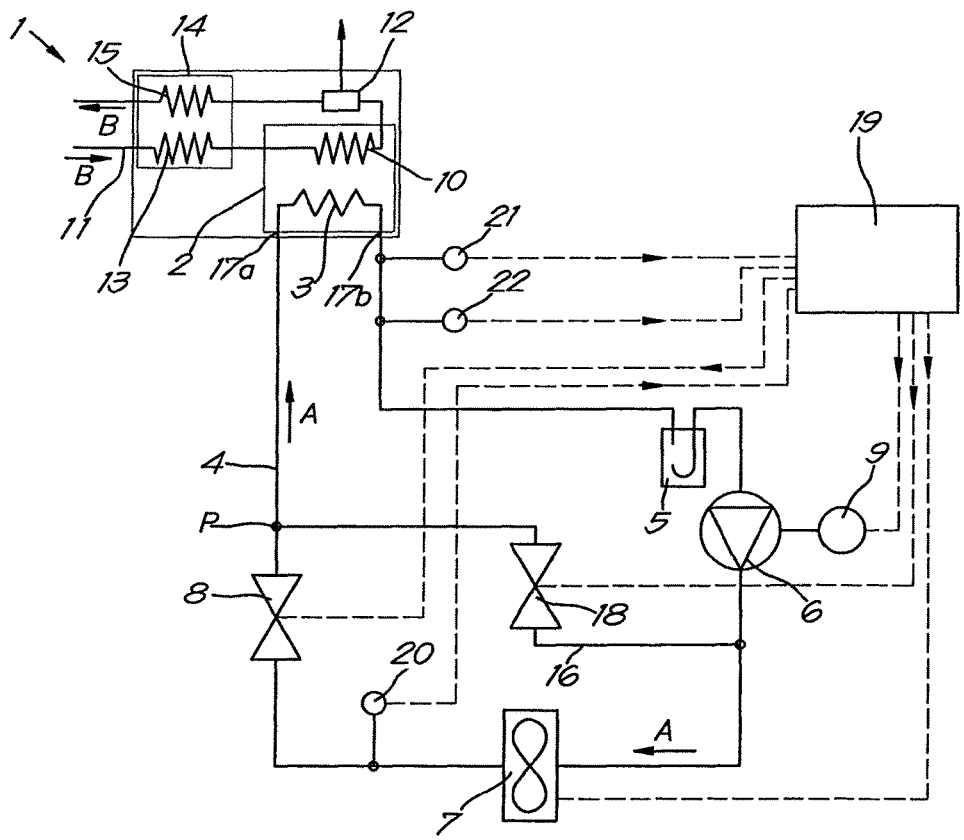
FIG. 1 schematically shows a cooling circuit for the application of a method according to the invention.

The device 1 for cool drying shown in FIG. 1 essentially consists of a heat exchanger 2 whose primary section forms the evaporator 3 of a closed cooling circuit 4, in which there is also successively a first liquid separator 5, a compressor 6, a condenser 7 and an expansion valve 8.

In this case the compressor 6 is driven by a motor 9 and is used to enable a coolant to circulate through the cooling circuit 4 according to the arrow A. The compressor 6 can be a volumetric compressor for example, while the motor 9 is an electric motor 9 for example.

The coolant can be R404a for example, but the invention is of course not limited as such.

In this case the expansion valve 8 is preferably an electronic expansion valve 8 that is controllable. In this case the expansion valve 8 is infinitely adjustable between a minimum state and a maximum state.

An electronic expansion valve 8 has the advantage that the expansion of liquid coolant to the evaporator 3 can be very accurately dosed according to the load for example, such that a more stable device 1 is obtained.

The secondary section 10 of the heat exchanger 2 forms part of a pipe 11 for moist air to be dried whose direction of flow is indicated by arrow B. The input of this pipe 11 can be connected, for example, to an outlet of a compressor for the supply of the compressed air to be dried.

A second liquid separator 12 is installed in the pipe 11 after the secondary section 10 of the heat exchanger 2, more specifically at its output.

In this case before reaching the secondary section 10 of the heat exchanger 2, a section 13 of this pipe 11 extends through a precooler or recovery heat exchanger 14. After the secondary section 10 a section 15 of this pipe 11 also extends through this recovery heat exchanger 14, with the opposite flow to the aforementioned section 13.

The output from the aforementioned pipe 11 can be connected, for example, to a compressed air network (not shown in the drawings) to which compressed air consumers are connected, such as tools that are driven by compressed air.

In this case the compressor 6 is bypassed by one bypass pipe 16 that connects the outlet of the compressor 6 to the injection point P, which in this case is upstream from the inlet 17a of the evaporator 3, but downstream from the expansion valve 8.

The bypass pipe 16 is constructed with a hot gas bypass valve 18 for tapping off coolant from the cooling circuit 4.

Preferably the hot gas bypass valve 18 is an electronic hot gas bypass valve 18, which has the advantage that it can be opened more or less such that the quantity of coolant injected via the bypass pipe can be adjusted.

This will enable the coolant to be injected again in the cooling circuit 4 upstream from the inlet 17a of the evaporator 3. It is clear that the injection point P can also be located downstream from the inlet 17a or the outlet 17b of the evaporator. In this last case the hot gas bypass valve 18 does not need to be an electronic valve.

In this case, the electronic hot gas bypass valve 18 is infinitely adjustable between a minimum or closed state and a maximum state in which it is fully open.

The electronic hot gas bypass valve 18 is connected to a control unit 19 to which, in this case, a number of means 20, 21 and 22 are also connected to determine the temperature and/or pressure of the coolant.

First means 20 are positioned at the condenser 7 to determine the condenser pressure $p_c$.

Second means 21 and third means 22 are placed after the evaporator 3 to determine the pressure $p_v$ and temperature $T_v$ respectively of the coolant in the evaporator 3. It is clear that these means can be implemented in different ways.

The control unit 19 is also connected to the condenser 7, the expansion valve 8 and the motor 9.

The method for cool drying by means of a device 1 according to FIG. 1 is very simple and as follows.

The air to be dried is carried through the pipe 11 and thus through the secondary section 10 of the heat exchanger 2 according to arrow B.

In this heat exchanger 2 the moist air is cooled under the influence of the coolant that flows through the primary section of the heat exchanger 2, or thus the evaporator 3 of the cooling circuit 4.

As a result condensate is formed that is separated in the second liquid separator 12.

The cold air that contains less moisture in absolute terms after this second liquid separator 12, but which has a relative humidity of 100%, is heated in the recovery heat exchanger 14 under the influence of the newly supplied air to be dried, such that the relative humidity falls to preferably below 50%, while the new air to be dried in the recovery heat exchanger 14 is already partially cooled before being transported to the heat exchanger 2.

The air at the output of the recovery heat exchanger 14 is thus drier than at the input of the heat exchanger 2.

In order to be able to cool the moist air to be cooled in the secondary section 10 of the heat exchanger, the coolant is guided through the cooling circuit in the direction of arrow A through the evaporator 3 or the primary section of the heat exchanger 2.

The hot coolant that comes from the evaporator 3 is in the gas phase and will be raised to a higher pressure by the compressor 6, then cooled in the condenser 7 and condensed.

The liquid, cold coolant will then be expanded by the expansion valve 8 and will cool further, before being driven to the evaporator 3 to cool the air to be dried there.

The coolant will warm up due to the effect of heat transfer in the evaporator 3, evaporate and be guided to the compressor 6 again.

Any liquid coolant still present after the evaporator 3 will be held back by the first liquid separator 5.

The control unit 19 will hereby control the expansion valve 8 and the hot gas bypass valve 18 on the basis of signals from the means 21 and 22 so that the desired level of superheating of the coolant after the evaporator 3 is obtained and a desired evaporator pressure $p_v$.

In the event of a change of the conditions, for example a change in the load of the cooling circuit 4, the state of the valves 8, 18 must be adjusted.

To this end there is one controller in the control unit 19, in this case for the state of the hot gas bypass valve 18. The state of the expansion valve is determined by means of a formula, which in this case is stored in the control unit 19.

Figure 2:
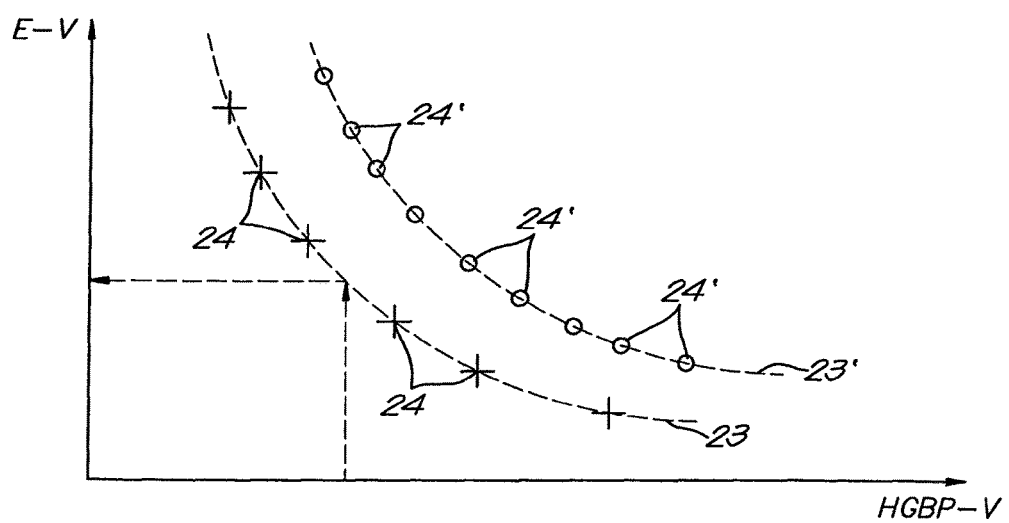
FIG. 2 schematically shows two curves that reflect the link between the state of the expansion valve and the hot gas bypass valve for a different condenser pressure.

This formula is determined experimentally and is derived from a curved 23, as shown in FIG. 2.

The curve 23 of FIG. 2 is made up of a number of different points 24 that are determined experimentally, whereby each point 24 reflects the state or opening of the expansion valve 8 and the associated state or opening of the hot gas bypass valve 18 for a specific load, whereby both valves 8, 18 are adjusted for this load to a desired evaporator pressure $p_v$ and a fixed level of superheating of the coolant, and whereby the condenser pressure $p_c$ is kept constant for the production of the curve 23.

In other words: every point 23 on the curve 24 corresponds to a specific load and the entire curve 24 is valid for one specific condenser pressure $p_c$.

The state or opening of the valves 8, 18 can be expressed as a % for example, whereby 0% corresponds to a completely closed valve and 100% corresponds to a completely open valve.

For another condenser pressure $P_c'$ an analogous curve 23' can be constructed from different experimentally determined points 24'.

A formula can be found on the basis of the curve 23 that defines the shape of the curve 23.

The formula is of the form $y=A*e^{B*x}$, whereby:
 y is the state of the expansion valve 8 and x is the state of the hot gas bypass valve 18;
 A and B are parameters that are experimentally determined.

For example, the parameters A and B depend on the condenser pressure, the coolant, the desired superheating and/or other environmental parameters.

Such a formula can be drawn up for each curve 23, 23'.

The formulae are stored in the control unit 19. During the operation of the device 1, the control unit will control the hot gas bypass valve 18 on the basis of the signal from the means 20 to keep the condenser pressure $p_c$ at the desired level.

In order to control the state of the expansion valve, the control unit will select the formula for the condenser pressure $p_c$ applicable at that time on the basis of the signal from the means 20.

On the basis of the state of the hot gas bypass valve 18, the state of the expansion valve 8 can be calculated with the formula.

This is schematically shown in FIG. 2: the correct curve 23, and thus the correct formula, is determined on the basis of the condenser pressure $p_c$. The state of the hot gas bypass valve 18 is read off from the curve 23, from which the accompanying state of the expansion valve 8 follows. The control unit 19 will adjust the expansion valve 8 to this state.

It is of course possible that the control unit 19 contains a controller for the expansion valve 8, whereby this valve 8 is controlled such that fixed superheating of the coolant is obtained after the evaporator 3 and that the associated state of the hot gas bypass valve 18 is determined on the basis of the formula, in a very analogous way as described above.

Furthermore it is also possible that instead of different formulae being stored in the control unit 19, it is possible for one single formula for a specific condenser pressure $p_c$ to be determined experimentally, and that when the condenser pressure $p_c$ departs from the aforementioned specific condenser pressure $p_c$, a correction factor C is applied to the formula, whereby the correction factor C depends on the condenser pressure $p_c$ applicable at that time.

In other words, one formula is stored in the control unit at one specific condenser pressure $p_c$. When the condenser pressure $p_c$ applicable at that time departs from the aforementioned specific condenser pressure $p_c$, the control unit 19 will apply a correction factor C when calculating the state of the expansion valve 8, whereby C will depend on the condenser pressure $p_c$.

Experiments have shown that the different curves 23, 23' for different condenser pressures $p_c$ can be obtained by means of a shift of the curve 23 by applying a correction factor C.

When the experimentally determined formula at the specific condenser pressure $p_c$ is of the form: $y=A*e^{B*x}$, the formula with correction factor will take on the following form: $y=(A+C)*e^{B*x}+C$, whereby:
 y is the state of the expansion valve 8 and x is the state of the hot gas bypass valve 18;
 A and B are parameters that are experimentally determined;
 C is a correction factor that depends on the condenser pressure $p_c$.

By applying the suitable correction factor C in the aforementioned formula, the formula of the curve 23' can be obtained for a different condenser pressure $p_c$.

Figure 3:
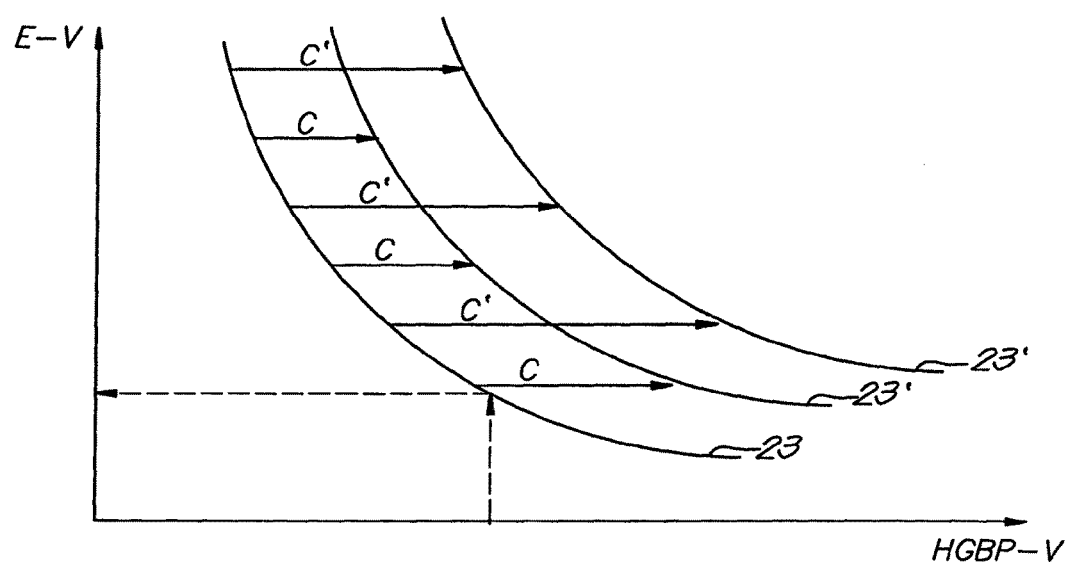
FIG. 3 schematically shows a method according to the invention.

This is schematically shown in FIG. 3 for two correction factors C and C'.

The method when using the formula with correction factor C is as follows.

The formula $y=(A+C)*e^{B*x}+C$ is in the control unit 19, whereby A and B are determined experimentally.

The control unit 19 will control the hot gas bypass valve 18 on the basis of the signal from the means 20 in order to determine the condenser pressure $p_c$.

On the basis of this condenser pressure $p_c$ the control unit 19 will also determine the suitable correction factor C to be applied to the formula.

The state of the expansion valve 18 can be calculated from this formula with the correction factor C and the state of the hot gas bypass valve 18. The control unit 19 will adjust the expansion valve 8 to this calculated state.

It is also possible that the control unit 19 is provided with two controls, one for the expansion valve 8 and one for the hot gas bypass valve 18, as is conventionally the case. Using the formula the states of both valves 8, 18 can be obtained with the adjustments controlled with respect to one another to be able to guarantee the good operation of the cooling circuit 4.

The present invention is by no means limited to the embodiments described as an example and shown in the drawings, but such a method for cool drying a gas according to the invention can be realised in different variants without departing from the scope of the invention.

The invention claimed is:

1. A method for cool drying a gas, whereby water vapour in the gas is condensed by guiding the gas through a secondary section of a heat exchanger whose primary section forms an evaporator of a closed cooling circuit in which a coolant can circulate by means of a compressor that is installed in the cooling circuit downstream from the evaporator and which is followed by a condenser and an expansion valve through which the coolant can circulate and a bypass pipe with a hot gas bypass valve therein that connects an outlet of the compressor to an injection point upstream from the compressor, wherein the method makes use of an experimentally determined formula that reflects the link between a state of the expansion valve and the hot gas bypass valve for control of fixed superheating of the coolant downstream from the evaporator and a desired evaporator pressure, whereby the experimentally determined formula is defined by a curve that is made up of different points, whereby each point reflects the state of the expansion valve and associated state of the hot gas bypass valve for a specific load, whereby both valves are controlled for this load at a desired evaporator pressure and a fixed level of superheating of the coolant, and whereby the condenser pressure is kept constant for the production of the curve, and whereby the method consists of, on the basis of this formula: either adjusting the state of the expansion valve as a function of the state of the hot gas bypass valve; or adjusting the state of the hot gas bypass valve as a function of the state of the expansion valve; or controlling the states of both valves with respect to one another.

2. The method according to claim 1, wherein the formula is of the form $y=A*e^{B*x}$, whereby:

y is the state of the expansion valve and x is the state of the hot gas bypass valve or vice versa;

A and B are parameters that are experimentally determined.

3. The method according to claim 2, wherein the formula with correction factor is of the form $y=(A+C)*e^{B*x}+C$, whereby:

y is the state of the expansion valve 8 and x is the state of the hot gas bypass valve 18 or vice versa;

A and B are parameters that are experimentally determined;

C is a correction factor that depends on the condenser pressure.

4. The method according to claim 1, wherein a formula is determined for different condenser pressures and that the suitable formula is applied depending on the condenser pressure applicable at that time.

5. The method according to claim 1, wherein one formula is experimentally determined for a specific condenser pressure and that, when the condenser pressure departs from the aforementioned condenser pressure, a correction factor is applied to the formula, whereby the correction factor depends on the condenser pressure applicable at that time.

6. The method according to claim 1, wherein the injection point is located upstream from the output of the evaporator and downstream from the expansion valve.

7. The method according to claim 1, wherein the expansion valve is an electronic expansion valve and/or that the hot gas bypass valve is an electronic hot gas bypass valve.

8. The method according to claim 1, wherein the method is used for drying gas that originates from a compressor.

* * * * *